(12) United States Patent
Keskikangas et al.

(10) Patent No.: US 12,120,421 B2
(45) Date of Patent: Oct. 15, 2024

(54) EVENT VIDEO SEQUENCES

(71) Applicant: Axis AB, Lund (SE)

(72) Inventors: Axel Keskikangas, Lund (SE); Viktor Edpalm, Lund (SE); Mattias Pettersson, Lund (SE)

(73) Assignee: AXIS AB, Lund (SE)

( * ) Notice: Subject to any disclaimer, the term of this patent is extended or adjusted under 35 U.S.C. 154(b) by 10 days.

(21) Appl. No.: 17/570,774

(22) Filed: Jan. 7, 2022

(65) Prior Publication Data

US 2022/0286621 A1 Sep. 8, 2022

(30) Foreign Application Priority Data

Mar. 2, 2021 (EP) ..................................... 21160211

(51) Int. Cl.
*H04N 23/65* (2023.01)
*G06T 5/00* (2006.01)
*G06V 20/40* (2022.01)
*G11B 20/10* (2006.01)
*G11B 27/028* (2006.01)

(52) U.S. Cl.
CPC .............. *H04N 23/651* (2023.01); *G06T 5/00* (2013.01); *G06V 20/44* (2022.01); *G11B 20/10527* (2013.01); *G11B 27/028* (2013.01); *G11B 2020/10712* (2013.01)

(58) Field of Classification Search
CPC .................................................. H04N 23/651
See application file for complete search history.

(56) References Cited

U.S. PATENT DOCUMENTS

| 8,676,027 | B2 | 3/2014 | Hugosson | |
|---|---|---|---|---|
| 9,615,023 | B2 | 4/2017 | Cho et al. | |
| 10,372,991 | B1* | 8/2019 | Niemasik | G06N 3/045 |
| 2006/0077256 | A1* | 4/2006 | Silvemail | H04N 5/76 348/143 |
| 2012/0014659 | A1* | 1/2012 | Hugosson | G08B 13/19669 386/E5.069 |
| 2013/0278620 | A1* | 10/2013 | Jow | H04N 21/41407 345/547 |
| 2017/0059265 | A1 | 3/2017 | Winter et al. | |
| 2017/0309307 | A1* | 10/2017 | Park | H04N 5/907 |
| 2018/0012462 | A1 | 1/2018 | Heitz, III et al. | |
| 2019/0373210 | A1 | 12/2019 | Nguyen et al. | |

FOREIGN PATENT DOCUMENTS

| EP | 2407943 A1 | 1/2012 |
|---|---|---|
| WO | 2019/194906 A1 | 10/2019 |

OTHER PUBLICATIONS

Extended European Search Report dated Jul. 5, 2021 for European Patent Application No. 21160211.5.

* cited by examiner

*Primary Examiner* — Daniel T Tekle
(74) *Attorney, Agent, or Firm* — Volpe Koenig

(57) ABSTRACT

A method of providing an event-initiated video sequence, comprises a pre-event video sequence and a post-event video sequence. The pre-event image frames are stored in a non-processed format until such time that an event is taking place. By postponing the image processing of the pre-event video sequence, power savings are accomplished.

12 Claims, 2 Drawing Sheets

EVENT VIDEO SEQUENCES

FIELD OF INVENTION

The present invention relates to capturing and processing event-initiated video sequences.

TECHNICAL BACKGROUND

Video cameras, such as surveillance cameras or monitoring cameras, are currently used in many different applications, both indoors and outdoors. Larger image sensors and other technological advances have greatly increased the image quality of video from such cameras, but at the same time the size, or expressed differently, the bitrate of the video streams has also increased. Since both storage capacity and network bandwidth are limited resources, it is a common measure not to store or stream all video, but only such video that is initiated or triggered by an event.

The term event is used here in its broadest meaning, thus, an event may be anything that could warrant the need for video documentation, and the term may encompass anything from a burglar alarm going off when a door is forced open, to the visit of a care professional in the home of a patient.

Often it is of interest to not only make video available from the time point when the event starts, but also record video showing a monitored area or scene during a time period right before the event starts. This is commonly solved by the use of a so-called pre-event video buffer, where a recent time interval of video is continuously recorded. When an event starts, the video recorded in the pre-event buffer is retrieved and included in the video clip depicting the event. U.S. Pat. No. 8,676,027 by the applicant of the present application discloses a method related to such pre-event buffers in camera.

Monitoring cameras may be mounted in various locations, often with one cable connection supplying power and another network access, or, in case of power over ethernet, PoE, being used, both of these via one connection. However, recently, wearable cameras, often referred to as body worn cameras, BWC, have seen a rise in popularity. Wearable cameras are used, e.g., by police officers or security guards, for capturing video and other data during patrols and incidents. Such cameras are typically battery powered. This means that the power available for a wearable camera is much more limited than for a camera mounted in a fix position. Therefore, means and measures that are perfectly sound when employed in a cable connected camera, e.g., in a camera mounted on a building, may be problematic in a BWC, since a much greater focus on power consumption is needed. One challenge is within the area of event-initiated recordings, where the use of a pre-event buffer requires the camera to be constantly recording video. This might quickly drain the battery, and therefore improvements in this area are of great interest.

SUMMARY

Facilitating power savings in a camera in connection with event triggered video would be beneficial.

According to a first aspect, a method of recording an event video sequence is presented, wherein the event video sequence comprises:

a pre-event video sequence containing video showing a monitored scene during a pre-determined length of time before an event detection, and a post-event video sequence containing video showing the monitored scene from the time of the event detection, wherein the method comprises the steps of:

continuously capturing image frames, continuously storing, in a pre-event buffer, newly captured image frames by adding them to a set of pre-event image frames corresponding to the pre-determined length of time, receiving a first signal indicating that an event is detected, upon receiving the first signal, discontinuing the storing of newly captured image frames in the pre-event buffer, feeding newly captured image frames to an image processing unit, performing image processing of the newly captured image frames in the image processing unit, and storing the processed image frames as the post-event video sequence in a memory, receiving a second signal indicating that the event has ended, upon receiving the second signal, discontinuing feeding newly captured image frames to the image processing unit, feeding the set of image frames from the pre-event buffer to the image processing unit, performing image processing of the set of image frames in the image processing unit, and storing the processed set of image frames as the pre-event video sequence in the memory.

By storing the set of image frames in the pre-event buffer without first processing them in the image processing unit, it is possible to accomplish a substantial reduction in the power consumed by the camera during a time period when no event is taking place, while still allowing a pre-event video sequence to be produced when needed, providing valuable insight into actions taking place in the time period leading up to the time when the first signal is received. By prioritizing the processing of the post-event video sequence over the processing of the set of pre-event image frames, it is possible to stream the post-event portion of the event video sequence from the camera to be viewed by a user in real-time or near real-time. The pre-event video sequence, showing the scene during a limited period of time leading up to the first signal, is then processed as soon as the second signal is received and the event ends, and can viewed shortly after.

In a camera powered by a battery, postponing the image processing of the set of images forming the pre-event video sequence until such time that it is actually needed prevents unnecessarily draining the battery of power. Thus, the battery will last longer and the camera can be used for longer time periods without having to be recharged. The method will also be useful in cameras where the total power draw needs to be kept within certain limits for other reasons, e.g., when the camera is powered from a power over ethernet, PoE connection, and needs to stay within a predetermined power class. The possible disadvantage is that a larger pre-event buffer is needed, since image frames take up more space in an unprocessed (raw) format than in a processed, and particularly encoded, format, but in a situation where power consumption reduction is of essence, this method will be an attractive option.

Another effect of postponing the processing and the subsequent storing of images in memory is that there will be less read/write operations performed on the memory, which in turn will increase the lifetime of the memory.

In addition, postponing the processing means that it might not be necessary to perform the processing of the image frames from the pre-event buffer in full frame rate, i.e., the processing of each image frame may be allowed to last longer. This may make it possible to utilize more advanced image processing and encoding algorithms, without adding more processing power. Allowing the processing to take place at less than full frame rate also means that the processing may take place at a lower clock frequency, which reduces the total power needed.

The method may further comprise the step of continuously discarding the oldest image frame from the pre-event buffer upon storing a newly captured image frame, or, in other words a circular buffer (first-in-first-out, FIFO) memory may be used for the pre-event buffer. This provides an efficient option for storing the un-processed set of image frames which makeup a potential pre-event video sequence.

The method may further comprise, prior to receiving the first signal, feeding a subset of image data of the newly captured images to the image processing unit. This subset of image data may be used for streaming to a remote user to give a general overview of the scene, e.g., during the entire visit to the scene by a person carrying the camera. The subset of image data may additionally, or as an alternative, be stored in the memory to be used at a later time.

The subset of image data may be generated by spatially subsampling the newly captured images, such that image frames having a reduced resolution compared to the newly captured images are fed to the image processing unit and, in addition or as an alternative, the subset of image data may be generated by temporally subsampling the newly captured image frames, such that a stream of image frames having a reduced frame rate compared to a frame rate of the newly captured image frames are fed to the image processing unit. Both alternatives provide means of creating a subset with only a very limited amount of image data which can be processed in the image processing unit without causing any major power use, while still allowing a general overview of the scene.

The step of storing newly captured image frames in the pre-event buffer may comprise compressing the image frames. In this way a more efficient storage of the unprocessed set of image frames is achieved, allowing for a smaller pre-event buffer to be used for the same amount of image frames stored therein. The compression used in this step will be a power efficient compression, such as run-length encoding or jpg encoding, which will not add much to the power consumed by the camera, while substantially reducing the size of the image frames.

The method may further comprise, after feeding the set of image frames from the pre-event buffer to the image processing unit, resuming to continuously store newly captured image frames in the pre-event buffer. In this way a new set of image frames will be available, which in turn can form the basis of new pre-event video sequences.

The step of performing image processing may include one or more of the following: defect pixel correction, white balancing, de-mosaicing, matrixing, gamma correction, sharpening, noise filtering, scaling and encoding.

Postponing the image encoding, until such time that an event is happening, in turn means that it will be possible to start both the pre-event video sequence and the post-event video sequence with an intra-coded frame (I-frame), which in turn will make decoding and viewing the event video sequence much more convenient. In prior art solutions where a pre-event video sequence is continuously encoded, there is less opportunity to control the encoding to ensure that an I-frame will have been encoded at the start of the event video sequence, and when viewing the prior art event video sequence, there will be a need to go back until the start of an encoded group of pictures (GOP), which at times might be as long as a minute, when decoding and viewing the event video. In the present method it will be possible to start the decoding and viewing exactly at the start of the event video sequence, due to the fact that it will be possible to start the encoding of the pre-event video sequence with an I-frame.

The first signal may be received from an image analyzing unit which is arranged to detect events in the monitored scene based on the captured image frames. Examples of processes used by such an image analyzing unit are video motion detection, object identification, foreground-background segmentation and other methods for determining, based on video images, that some type of event of interest is taking place in the scene.

In addition, or as an alternative, the first signal may be received from an external event detection unit arranged to detect events in the monitored scene. The term external should be interpreted as being external to the camera, or working independently of the camera, or being separated from the camera, such as being physically or logically separated from the camera. Such an external event detection unit may include a sensor for detecting that a weapon has been pulled from a holster or a motion sensor sensing, e.g., that a person carrying the camera has fallen, has been pushed, or has started running. The external event detection unit may also include some kind of positioning sensor, such as for receiving a GPS signal, to indicate that the camera has entered an area where it needs to record video. Other examples of events that may be detected by an external event detection are changes in a GPS connection or in a connection to a communication network, such as a connection to a wifi network or a cellular network.

The external event detection unit may also include a sensor being able to sense motion or objects in the scene, such as a PIR sensor, a radar or a lidar. In some cases, the external event detection unit may also be another camera. The other camera may be of the same type as the camera itself, or have another configuration entirely. As an example, if the camera employing the method presented herein is a body worn camera, the other camera may either be another, similar body worn camera, or it may be a monitoring camera mounted for surveillance of the scene, such a thermal camera or a visual camera. This camera may be able to send the first signal to any body worn cameras that are in the vicinity.

As another option, audio or sound from the scene may be analyzed to find indications that an event warranting a video recording is taking place, e.g., sounds of gunshots or loud screaming voices.

The second signal may be generated as a response to the first signal no longer being received. This might, e.g., be the case when the first signal is received from a motion sensor indicating that a person wearing the camera is running, and the sensor indicates that the person has stopped running.

In addition, or as an alternative, the second signal may be generated in response to a timer reaching a predetermined value, the timer being started when the first signal is received. This may be useful in a situation where it can safely be assumed that any events needing to be recorded on video will have a duration shorter than the predetermined value. The second signal may be generated by the external event detection unit based on some kind of data, or lack of such, from any of the sensors that were used to generate the first signal.

The method may further comprise the step of, upon receiving the first signal indicating that an event is detected, streaming the processed image frames of the post-event video sequence to a recipient. In this way a third party, such as a security operator, can be notified immediately that an event is taking place in the scene, and can take appropriate action such as sending backup to personnel present in the scene. The video can, e.g., be streamed to a remote server via a mobile phone network or other type of wireless network connection. The security operator may view the streamed images via a video management system being connected to the remote server.

According to a second aspect, a monitoring camera configured to record an event video sequence is provided,
wherein the event video sequence comprises,
a pre-event video sequence containing video showing a monitored scene during a pre-determined length of time before an event detection, and a post-event video sequence containing video showing the monitored scene from the time of the event detection,
wherein the camera comprises,
an image capturing unit configured to continuously capture image frames,
a pre-event buffer configured to continuously store newly captured image frames by adding them to a set of pre-event image frames corresponding to the pre-determined length of time,
an event unit configured to receive a first signal indicating that an event is detected, and a second signal indicating the event has ended,
an image processing unit configured to process image frames,
a memory configured to store processed image frames,
wherein, upon the receipt of the first signal,
the camera is configured to discontinue storing newly captured image frames in the pre-event buffer and to feed newly captured images to the image processing unit,
the image processing unit is configured to perform image processing of the newly captured image frames, and to store the processed images as the post-event video sequence in the memory
wherein, upon receipt of the second signal,
the camera is configured to discontinue feeding newly captured image frames to the image processing unit,
the camera is configured to feed the set of image frames from the pre-event buffer to the image processing unit,
the image processing unit is configured to perform image processing of the set of image frames,
the camera is configured to store the processed set of image frames as the pre-event video sequence in the memory.

The above mentioned features of the method according to the first aspect, when applicable, apply to this second aspect as well. In order to avoid undue repetition, reference is made to the above.

A further scope of applicability of the present concepts will become apparent from the detailed description given below. However, it should be understood that the detailed description and specific examples, while indicating preferred embodiments, are given by way of illustration only, since various changes and modifications within the scope of the concepts will become apparent to those skilled in the art from this detailed description.

Hence, it is to be understood that concepts described hereinafter are not limited to the particular component parts of the device described or acts of the methods described as such device and method may vary. It is also to be understood that the terminology used herein is for purpose of describing particular embodiments only and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTION OF THE DRAWINGS

The present concepts will now be described more fully hereinafter with reference to the accompanying drawings, in which currently preferred embodiments are shown. This concepts may, however, be embodied in many different forms and should not be construed as limited to the embodiments set forth herein; rather, these embodiments are provided for thoroughness and completeness, and to fully convey the scope of the concepts to the skilled person.

DETAILED DESCRIPTION

Figure 1:
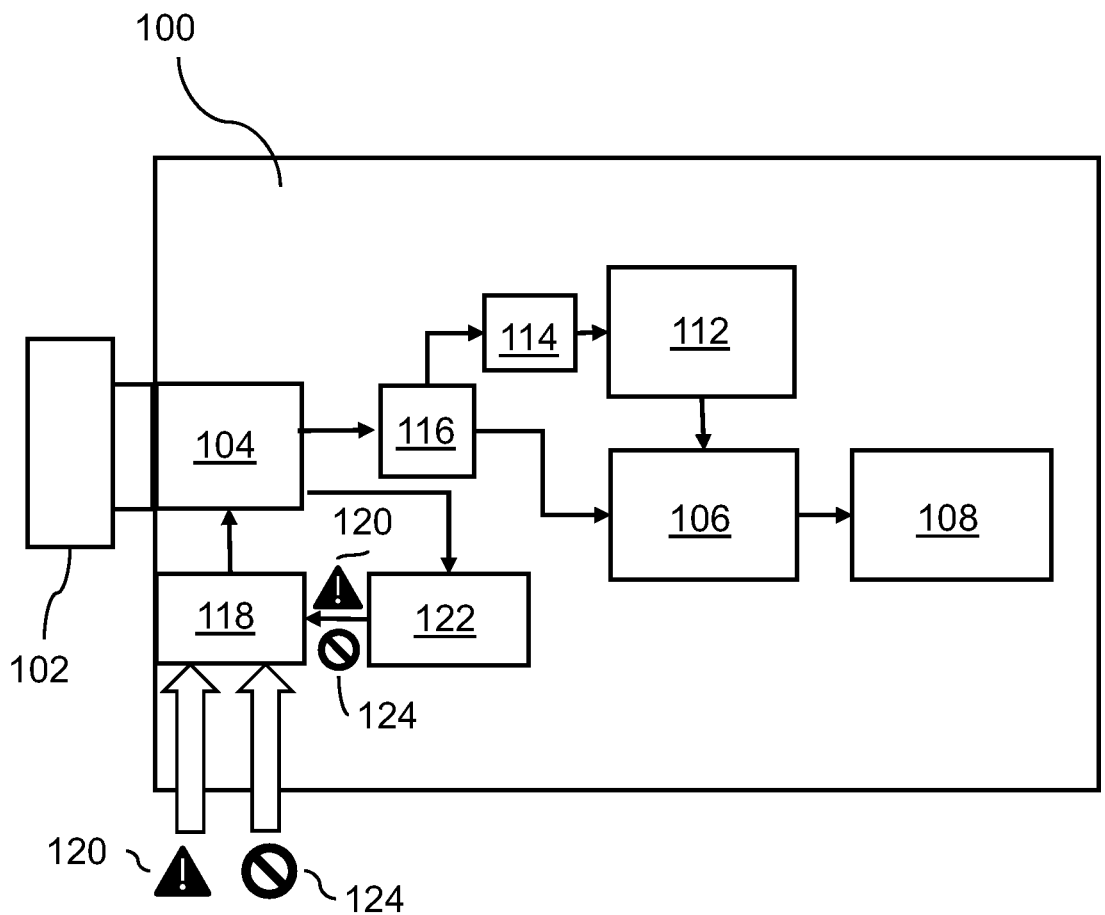
FIG. 1 illustrates a camera.

FIG. 1 depicts a camera, such as a wearable, or body worn camera, BWC, 100. The camera 100 has optics 102 and an image capturing unit 104 with an image sensor, as is generally known per se.

Returning to FIG. 1, the camera 100 also includes an image processing unit 106 and a memory 108 for storing processed images. The memory 108 may be provided in the form of an SD card or a flash memory. In the context of this application, the term image processing may encompass a large variety of actions, some examples being defect pixel correction, white balancing, de-mosaicing, matrixing, gamma correction, sharpening, noise filtering, scaling and encoding.

The camera also includes a pre-event buffer 112 which is configured to store a set of pre-event image frames received from the image capturing unit 104. The pre-event buffer may be provided in the form of a memory adapted for temporary storage, such as a RAM, DRAM or SRAM memory.

Commonly, the pre-event buffer 112 is configured as a circular buffer or a first-in-first-out, FIFO buffer memory, where a newly captured image fed to the pre-event buffer 112 from the image capturing unit 104 will replace the oldest image already stored in the pre-event buffer 112. However, other configurations of the pre-event buffer 112 would also be possible. Further refinements may also be made in the selection of which images to discard from the pre-event buffer. As an example, in a situation where HDR/WDR video is captured, it would be possible to decide to discard either all long exposure or short exposure images. It would also be possible to discard every second images or every third image etc, in case a longer time period with lower frame rate would be considered useful when producing the pre-event video sequence.

The pre-event buffer 112 is arranged upstream of the image processing unit 106. Hence, the set of pre-event image frames that are stored in the pre-event buffer 112 have not been processed by the image processing unit 106, which means that they will typically be larger than they would have been after being processed by the image processing unit 106, as is the case in prior art solutions for producing pre-event video sequences. However, in a situation where conserving power is of the essence, it is better to add more storage space to the pre-event buffer 112 to enable storage of a set of raw, or nearly raw image frames from the image capturing unit 104, than to spend power on unnecessarily processing image data that might later be discarded due to the lack of events requiring a pre-event video sequence.

Optionally, a simple compression in a compression unit 114, such as in the form of lossless run-length encoding, e.g., using a specialized hardware block, or jpeg compression with, e.g., 4×4 or 8×8 blocks, which does not consume an extensive amount of power and is still able to reduce the size of the captured image frames roughly by a factor ten, may be performed on the image frames prior to storing in the pre-event buffer 112. The compression method chosen is normally of a type that avoids temporal dependencies between images. In this way a smaller pre-event buffer can be used to store the same amount of image frames.

In addition, or as an alternative, it is possible to perform a limited image processing, with processing steps that consume very little power, before storing the image frames in the pre-event buffer 112. This can be illustrated as moving such steps from the image processing unit 106 into in a separate initial image processing unit 116 and allow the pre-event image frames to be processed here prior to storing them in the pre-event buffer 112. It may be noted that showing this as a separate unit is merely for the sake of illustration, and could also be illustrated as the image processing unit 106 having an output feeding images to the pre-event buffer 112 after having performed only such initial steps that are exemplified here below.

Examples of steps that could be performed by the initial image processing unit 116 prior to the storing in the pre-event buffer 112 are defect pixel correction and de-mosaicing, the latter also being called color interpolation or reconstruction, i.e., the process of converting an image from Bayer to RGB values. Reasons for performing those steps in the initial image processing unit 116 are that they consume a limited amount of power and that they are performed at the start of the image processing.

In addition, the Bayer to RGB conversion results in increased smoothness, which in turn makes the images more readily compressible, thereby making it possible for the optional compression unit 114 to increase the reduction in image size, which in turn will enable the use of a smaller pre-event buffer 112 for storing the set of pre-event image frames, or, if so desired, allow the storage of a larger number of pre-event image frames in the pre-event buffer 112.

However, it is important to note that the pre-event images frames are stored in a largely un-processed, or raw, format in the pre-event buffer 112, in order to consume as little power as possible on processing images that are possibly not going to be of interest and which will be discarded. It should be noted that the camera 100 is continuously capturing video of the scene, but the images are not fed to the image processing unit 106 and the memory 108. The captured image frames are merely stored in the pre-event buffer 112, usually in a temporary fashion, as described above.

Hence, the image frames are not sent to the image processing unit 106 until such a point in time when an event is taking place which requires a recording of video by the camera 100. However, as will be discussed in more details further below in this text, there may be cases where a subset of image data from the image capturing unit 104 is fed to the image processing unit 106 also during a time when an event is not taking place.

Figure 2:
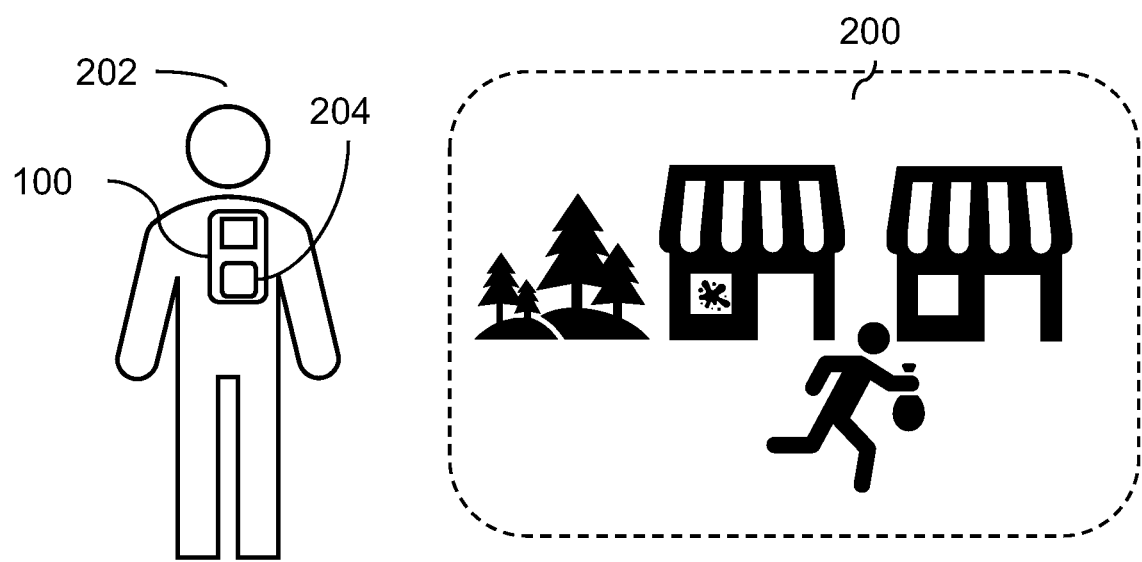
FIG. 2 depicts a situation in which the camera of FIG. 1 is used.

In FIG. 2, a typical situation where the camera 100 is in use is illustrated. The camera 100 is used to monitor a scene 200 and is worn by a person 202. In the scene 200 various activities may take place, and at some point in time, the person 202 may decide that an event is taking place which requires a video recording to start.

The person 202 will then activate a switch or press a button 204 provided on the camera 100 for the purpose of allowing a recording of video to be started. When the button 204 is pressed, a first signal 120 is sent to an event unit 118 provided in the camera 100. A press on the button 204 is one of several examples where an external event detection unit signals to the camera 100, or more precisely to the event unit 118, that an event, has happened, has started or is taking place which requires a video recording.

Other examples of such external event detection units, and events detected that may be the cause of the first signal 120, include a pressure sensor or motion sensor which signals that a weapon has been drawn from a holster, typically in a situation when the camera 100 is carried by a police officer, or a sensor comprising an accelerometer or gyro which signals that a certain type of motion is taking place indicating that the person carrying the camera 100 is moving in a certain way. An example of this is motion that indicates that a fall has taken place, e.g., that the camera (and the person) has moved from a vertical position (standing up) to a horizontal position (lying on the ground). Another example is that the sensor detects motion indicating that a person carrying the camera is being pushed or shoved.

Another example of an external event detection unit that can be used to provide the first signal 120 to the event unit 118 is a motion detector detecting motion in the scene. The motion detector detecting motion in the scene may be a PIR sensor, a depth of field sensor, a laser, a radar or another type of device which is able to sense motion in the scene. More advanced analysis of the scene may also be performed, which may give the possibility to ignore motions smaller than a threshold, repeating motions or motions from a certain scene area known to include e.g., swaying trees. All of these are examples which can cause the external event detection unit to send the first signal 120 to the event unit 118.

Another example of an external event detection unit generating the first signal would be an audio analysis unit which is configured to capture and analyze sound or audio in the scene, such as the sounds of gunshots or screaming voices indicating that an event is taking place, and then send the first signal 120 in response thereto.

Another example of an external event detection unit is a position determining unit, which uses a GPS signal, or some other positioning signal to determine that the camera has reached a position or an area wherein it needs to record video. In response to such a determination, the external event detection unit sends the first signal 120 to the event unit 118. A changed connection status to a GPS network or another type of positioning network may also cause the first signal 120 to be sent.

Other examples of events that may be detected by an external event detection unit and cause the first signal 120 to be sent to the event unit 118 are changes in a connection to a communication network, such as a connection to a wifi network or a mobile phone network.

Yet another example of how the first signal may be accomplished is to use an image analyzing unit 122 which analyzes the captured image frames to find specific content in the scene, such as motion having certain characteristics, or objects that fulfil certain pre-determined criteria.

When the event unit 118 receives the first signal 120, the image capturing unit 104 will halt the feeding of image frames to the pre-event buffer 112, and newly captured image frames will instead be fed from the image capturing unit to the image processing unit 106 which performs image processing of the image frames. The processed image frames from the image processing unit 106 are stored in the memory 108 as a post-event video sequence.

At some point in time after the first signal has been received by the event unit 118, a second signal 124 will be received by the event unit 118. The second signal 124 indicates that the event requiring video recording has stopped, or in some cases, is likely to have stopped. The second signal may be generated by the person 202 pressing the button 204 a second time to indicate that the video recording can be stopped. A second button may also be provided on the camera 100 for the purpose of generating the second signal.

Another option for generating the second signal 124 is from a timer which is started when the first signal 120 is received, and generates the second signal 124 after a pre-defined time has lapsed, or the input, or lack of input from sensors included in the external event detection unit. For instance, the second signal 124 may be generated by a sensor indicating a weapon being re-inserted in a holster, or a sensor indicating that a motion has stopped. In addition, just as when the first signal is generated, image frames may be analyzed by the image analyzing unit 122 to determine that the event that triggered the video recording has now stopped, triggering the generation of the second signal.

Other types of input may also be used to generate the second signal. Such input may be from sensors which indicate, e.g., that the person carrying the camera has left a certain area or position, that a sound has ceased, or that motion in the scene has stopped or objects have left the scene.

As previously discussed, there is often a need to see what happened also before the first signal 120 was generated, i.e., a pre-event video sequence is needed. Therefore, at the receipt of the second signal 124, the feed of image frames from the image capturing unit 104 to the image processing unit 106 will be halted, and instead the set of image frames that were waiting in the pre-event buffer 112, while the image processing unit 106 received the image frames from the image capturing unit 104, will now be fed to the image processing unit 104. There the set of images will be processed, and then the processed set of images will be added to the memory 108 as a pre-event video sequence to the post-event video sequence that was previously stored in the memory 108. In addition, the image capturing unit 104 will recommence the feeding of newly captured images to the pre-event buffer 112, which is now ready to start receiving images again.

It may be noted that the set of image frames from the pre-event buffer can be processed at less than full frame rate, i.e., more time can be used to process each image frame than is allowed when processing live video. In this way a more advanced image processing can be used, or the image processing unit 106 may be set to use less power to process each image frame, e.g., by being set to run at a lower clock frequency. Processing the set of image frames at less than full frame rate is favorably combined with using a larger pre-event buffer, in order to allow storing of new potential pre-event image frames, while the set of image frames is being processed.

Figure 3:
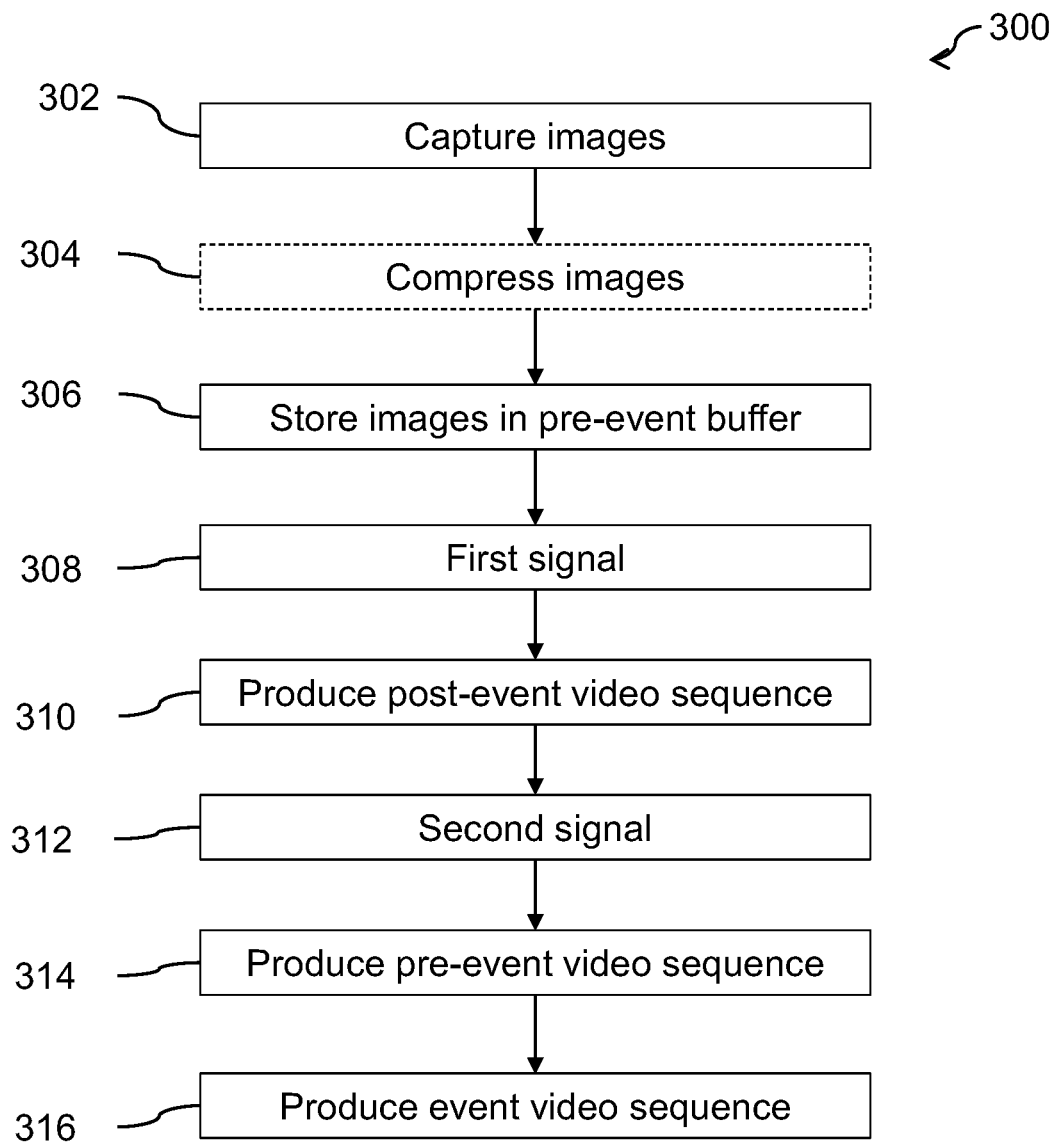
FIG. 3 is a flow chart illustrating a method according to certain embodiments.

In FIG. 3 a method 300 of recording an event video sequence is illustrated. In step 302, image frames are captured by the image capturing unit 104. In an optional step 304 the image frames are compressed before being stored in a pre-event buffer 112 in step 306. At some point in time, the first signal 120 indicating an event taking place is received in step 308. The image capturing unit 104 then stops sending image frames to the pre-event buffer 112 for storing and the image frames are instead sent to the image processing unit 106 to be processed and to the memory 108 for storage in order to produce the post-event video sequence in step 310.

As an optional measure in this step, the processed images may also be streamed to a remote recipient, e.g., in the form of a server providing immediate access to a logged in operator to the video captured by the camera 100 after receipt of the first signal 120, in order for the operator to determine if action is needed, such as sending help to the person 202 carrying the camera 100.

In step 312 the second signal 124 is received which indicates the end of the event. The pre-event video sequence is then produced in step 314 by feeding the set of image frames stored in the pre-event buffer 112 to the image processing unit 106 for processing and by feeding the processed set of images to the memory 108 for storage as the pre-event video sequence. In case the image frames were compressed in connection with being stored in the pre-event buffer 112, a suitable decompression is performed prior to the processing in the image processing unit 106. The post-event video sequence and the pre-event video sequence together forms the event video sequence in step 316, stored in the memory 108.

It should be noted that step 302 takes place continuously during the operation of the camera and is only presented as a first step for illustrative purposes. Also, at the receipt of the second signal, when the contents of the pre-event buffer 112 are fed to the image processing unit, the image capturing unit 104 will once again feed image frames to the pre-event buffer 112, which, after optional compression of the images, will store the image frames as a new set of image frames in preparation for a next event taking place and a new pre-event video sequence being produced.

As mentioned previously, in a variant of the solution presented in this text, a subset of image data may be fed from the image capturing unit 104 to the image processing unit 106, during such time when image frames are fed to the pre-event buffer 112, i.e., when no event has been indicated to take place. This subset of image data may, e.g., be used for streaming from the camera 100. The subset of image data is either provided by spatially subsampling the captured image frames to provide lower resolution image frames, or by temporally subsampling the captured image frames to provide a reduced frame rate, or both. The processed subset of image data may also be stored in the memory 108 and be used when producing the event video sequence.

The storing of the processed subset of image data may take place in a fashion similar to how images are stored in the pre-event buffer 112, i.e., older images may be discarded after a certain time has passed or after a certain amount of new images have been added to the memory. The camera may be set up to feed only such image data from the image capturing unit 104 to the pre-event buffer 112 that has not been included in the temporally or spatially subsampled image data that is used for streaming. When the pre-event video sequence is produced, the image processing unit 106 will then combine the set of image frames from the pre-event buffer 112 with the previously processed subset of image data to provide a full pre-event video sequence.

It may be noted that the different units described above, e.g., the image processing unit 106, the compression unit 114, the initial image processing unit 116, the event unit 118 and the image analyzing unit 122, may each be implemented in hardware of software, or any combination thereof. One or more of the units may be provided in the form of specialized circuitry configured to performed the function of the respective unit, or as a set of software program instructions implemented to run on a standard processing unit and perform the function of the respective unit.

On a final note, it should be mentioned that other variations to the disclosed embodiments can be understood and effected by the skilled person in practicing the claims, from a study of the drawings, the disclosure, and the appended claims.

An example of such a variation is that even though the concepts have been described in connection with a body worn camera, it can also be used, e.g., in a camera mounted on a building or in a vehicle. If the camera has a limited amount of power available, or if there are other reasons for wishing to save power in connection with event video recording in a situation where it is possible to provide a more generous supply of memory space in the pre-event buffer, the solutions described herein can be utilized to provide a lowered power consumption during those time periods when no event is taking place.

In summary, a method of providing an event-initiated video sequence, comprising a pre-event video sequence and a post-event video sequence is presented. The pre-event image frames are stored in a non-processed format until such time that an event is taking place. By postponing the image processing of the pre-event video sequence, power savings are accomplished.

The invention claimed is:

1. A method of recording an event video sequence, wherein the event video sequence comprises a pre-event video sequence showing a monitored scene during a pre-determined length of time before an event detection, and a post-event video sequence showing the monitored scene from the time of the event detection:

the method comprising the steps of:
continuously capturing image frames,
continuously storing, in a pre-event buffer, newly captured image frames by adding them to a set of pre-event image frames corresponding to the pre-determined length of time, wherein the newly captured image frames that are stored in the pre-event buffer have not yet been subject to image processing consisting of one or more of defect pixel correction, white balancing, de-mosaicing, matrixing, gamma correction, sharpening, noise filtering, scaling and encoding in an image processing unit,
receiving a first signal indicating that an event is detected,
upon receiving the first signal,
discontinuing the storing of newly captured image frames in the pre-event buffer,
feeding newly captured image frames to the image processing unit,
performing image processing of the newly captured image frames in the image processing unit, and
storing the processed image frames as the post-event video sequence in a memory,
receiving a second signal indicating that the event has ended,
upon receiving the second signal,
discontinuing feeding newly captured image frames to the image processing unit,
feeding the set of image frames from the pre-event buffer to the image processing unit,
performing image processing of the set of image frames in the image processing unit, and
storing the processed set of image frames as the pre-event video sequence in the memory;
wherein the image processing includes one or more of the following: defect pixel correction, white balancing, de-mosaicing, matrixing, gamma correction, sharpening, noise filtering, scaling and encoding.

2. The method of claim 1, further comprising the step of continuously discarding the oldest image frame from the pre-event buffer upon storing a newly captured image frame.

3. The method of claim 1, further comprising, prior to receiving the first signal, feeding a subset of image data of the newly captured images to the image processing unit.

4. The method of claim 3, wherein the subset of image data is generated by spatially subsampling the newly captured images, such that image frames having a reduced resolution compared to the newly captured images are fed to the image processing unit.

5. The method of claim 3, wherein the subset of image data is generated by temporally subsampling the newly captured image frames, such that a stream of image frames having a reduced frame rate compared to a frame rate of the newly captured image frames are fed to the image processing unit.

6. The method of claim 1, further comprising, after feeding the set of image frames from the pre-event buffer to the image processing unit, resuming to continuously store newly captured image frames in the pre-event buffer.

7. The method of claim 1, wherein the first signal is received from an image analyzing unit which is arranged to detect events in the monitored scene based on the captured image frames.

8. The method of claim 1, wherein the first signal is received from an external event detection unit arranged to detect events in the monitored scene.

9. The method of claim 1, wherein the second signal is generated as a response to the first signal no longer being received.

10. The method of claim 1, wherein the second signal is generated in response to a timer reaching a predetermined value, the timer being started when the first signal is received.

11. The method of claim 1, further comprising the step of, upon receiving the first signal indicating that an event is detected, streaming the processed image frames of the post-event video sequence to a recipient.

12. A monitoring camera configured to record an event video sequence,
wherein the event video sequence comprises a pre-event video sequence containing video showing a monitored scene during a pre-determined length of time before an event detection, and a post-event video sequence containing video showing the monitored scene from the time of the event detection, the camera comprising:

an image capturing unit configured to continuously capture image frames, an event unit configured to receive a first signal indicating that an event is detected, and a second signal indicating the event has ended, an image processing unit configured to process image frames, a pre-event buffer arranged upstream of the image processing unit and configured to continuously store newly captured image frames by adding them to a set of pre-event image frames corresponding to the pre-determined length of time, wherein the newly captured image frames that are stored in the pre-event buffer have not yet been subject to image processing consisting of one or more of defect pixel correction, white balancing, de-mosaicing, matrixing, gamma correction, sharpening, noise filtering, scaling and encoding in the image processing unit, a memory configured to store processed image frames, wherein, upon the receipt of the first signal, the camera is configured to discontinue storing newly captured image frames in the pre-event buffer and to feed newly captured images to the image processing unit, the image processing unit is configured to perform image processing of the newly captured image frames, and to store the processed images as the post-event video sequence in the memory, wherein, upon receipt of the second signal the camera is configured to discontinue feeding newly captured image frames to the image processing unit, the camera is configured to feed the set of image frames from the pre-event buffer to the image processing unit, the image processing unit is configured to perform image processing of the set of image frames, the camera is configured to store the processed set of image frames as the pre-event video sequence in the memory;

wherein the image processing includes one or more of the following: defect pixel correction, white balancing, de-mosaicing, matrixing, gamma correction, sharpening, noise filtering, scaling and encoding.

* * * * *